United States Patent [19]

Mühlfeld et al.

[11] Patent Number: 5,506,787
[45] Date of Patent: Apr. 9, 1996

[54] CONFIGURABLE MAN-MACHINE COMMUNICATION STRUCTURE FOR MACHINE TOOL OR ROBOT CONTROL SYSTEMS

[75] Inventors: Reinhard Mühlfeld, Veitsbronn; Ernest Schussler, Hausen, both of Germany

[73] Assignee: Siemens Aktiengesellschaft, München, Germany

[21] Appl. No.: 392,835

[22] PCT Filed: Aug. 31, 1992

[86] PCT No.: PCT/DE92/00722

§ 371 Date: Feb. 28, 1995

§ 102(e) Date: Feb. 28, 1995

[87] PCT Pub. No.: WO93/01703

PCT Pub. Date: Feb. 4, 1993

[51] Int. Cl.$^6$ ........................................ G06F 19/00
[52] U.S. Cl. ........................ 364/474.23; 364/474.24; 364/191
[58] Field of Search .................. 364/188–193, 364/474.15, 474.16, 474.17, 474.22, 474.23, 474.24, 474.26, 468

[56] References Cited

U.S. PATENT DOCUMENTS

| 4,635,208 | 1/1987 | Coleby et al. | 364/491 |
| 5,237,654 | 8/1993 | Schackelford et al. | 395/160 |
| 5,247,447 | 9/1993 | Korncoft et al. | 364/468 |
| 5,272,642 | 12/1993 | Suzuki | 364/474.24 |

FOREIGN PATENT DOCUMENTS

| 0233949 | 9/1987 | European Pat. Off. . |
| 0262922 | 4/1988 | European Pat. Off. . |
| 0298396 | 1/1989 | European Pat. Off. . |
| 0304071 | 2/1989 | European Pat. Off. . |
| 0311703 | 4/1989 | European Pat. Off. . |

OTHER PUBLICATIONS

Computers in Industry, vol. 14, No. 1/3, May 1990, F. L. Krause, Amsterdam, NL, pp. 109–116: *Technological Planning Systems for the Future*.
Manufacturing Technology International, No. 1, 1987, London, GB, pp. 66–69: *The Design of a Database Management System for CIM*.
Manufacturing Technology International, No. 1, 1987, Ken J. Lindsay, Northrop Corporation, London, GB, pp. 249–252: *Expert Systems in the CIM Environment*.
VDI-Z 133, No. 12, Dec. 1991, pp. 60, 63–65, Von Jürgen Schmidt et al.: *Objektorientierte Projektierung von Steuerungssoftware*.

Primary Examiner—Roy N. Envall, Jr.
Assistant Examiner—Thomas E. Brown
Attorney, Agent, or Firm—Kenyon & Kenyon

[57] ABSTRACT

A numerical control system for machine tools or robots has in the area of man-machine communication (MMC) initially a universal form, which can be tailored in the simplest possible way to any applications. Information handling provides control data which can be processed in a universal manner by an integrated control kernel (CK) and thus ensures control of the machine and robot drives (ANT), including peripherals (PER).

6 Claims, 4 Drawing Sheets

CONFIGURABLE MAN-MACHINE COMMUNICATION STRUCTURE FOR MACHINE TOOL OR ROBOT CONTROL SYSTEMS

BACKGROUND OF THE INVENTION

The present invention relates generally to numerical control systems, and more particularly to a numerical control system for machine tools or robots, in which an object-oriented programming takes place, in that object classes are provided, from which in each case a number of objects can be formed, and a message mechanism existing for communication with other objects.

Such control systems are disclosed in VDI journal 133, no. 12, December 1991, Jürgen Schmidt et al. "Objektorientierte Projektierung von Steuerungssoftware" [Object-oriented user-configuration of control software], pages 60, 63–65.

The increasing diversity of applications for modern numerical control systems (NCSs) for machine tools or robots goes hand in hand with the necessity for the application-oriented configuration of NCS system behavior. Man-machine communication and the associated information handling are particularly subject to these growing requirements for flexibility.

Control systems which allow user-specific configuration and in this sense are referred to as "user-configurable" have defined degrees of freedom which allow purposeful configuration interventions in the application environment. Adapting the system behavior to the actual final application generally takes place in coordinated configuration phases by different target groups, i.e. in the specific case of NCS control technology starting with the groups, i.e. in the specific case of NCS control technology starting with the control system manufacturer, through to the machine manufacturer and ending up with the final machine user.

From a technical viewpoint there is consequently the requirement to provide control systems which operate in a new way, which initially have a universal form and subsequently are tailored globally and later locally to the actual final task.

To be able to perform the configuration procedure effectively, the overall requirements with the corresponding means of realizing them must be divided among the target groups involved in a way appropriate to their needs. Appropriate to their needs essentially means that the extent of the necessary instrumentation, the powerfulness of the integrated configuration tools and the granularity of the possibilities for intervention must in each case be brought into accord with the needs of the target group in question.

Existing approaches to the configuration of user-configurable NCS control systems usually concentrate on indirectly influencing the system behavior. For instance, the control system manufacturer defines in the development phase system interfaces which can be addressed by means of integrated or external configuration tools. In the simplest case, the means made available allow the mapping of application-specific parameters (for example machine parameters) onto internal system parameters, subsequently the storing of encoded description data (for example screen layout, operating sequences etc.) or else language-oriented command sequences (for example operating cycles) which are interpreted during the system run time. The powerfulness of the configuration tools used ranges from simple table editors to compiler structures which also allow the inclusion of application-specific algorithms. A target-group oriented graduation of the possibilities for intervention in the application environment is achieved-partly implicitly by locating the necessary configuration means system-externally or else system-internally by hierarchical access mechanisms.

Characteristic of existing solutions is the fact that the actual system behavior cannot be modified directly, because the fundamental hardware, data and program structures under the configuration interfaces are inflexibly predetermined by the usual approaches to implementation.

Furthermore, it should be noted that conventional configuration interfaces generally have an inadequate degree of system abstraction to allow them, for example, to be described for OEM applications (Original Equipment Manufacturing) and, in the final analysis, also do not offer any possibility of mapping technological application specifics which cannot be formulated algorithmically (for example technological empirical values).

Furthermore, reference is also made to EP-A-0 289 391, which shows as background for the prior art a modularly constructed numerical control system, which however does not allow simple alteration of the configuration. Furthermore, EP-A-0 304 071 discloses a data processing system which in very general terms is independent of an actual application and is in an object-oriented system environment, but this document does not provide a person skilled in the art with any suggestion of using such a system for a numerical control system, in particular a machine tool or robot control system. This document addresses a person skilled in data processing systems, for example in word processing or data base applications, because its intention is to facilitate the desired exchange of data within various data processing programs.

The present invention is directed to the problem of developing a numerical control system for machine tools or robots of which the initially universal form in the area of man-machine communication can be tailored in the simplest possible way to any applications, the associated information handling providing control data which can be processed in a universal manner by an integrated numerical control kernel and thus ensuring control of the machine or robot drives, including peripherals.

SUMMARY OF THE INVENTION

The present invention solves this problem in a control system of the type stated at the beginning by providing:
  a) a man-machine interface, a sequence control and software or software and hardware object classes for abstract types of data on machining, geometry, kinematics, technology etc.;
  b) a special object class for abstract types of control data, together with an integrated numerical control kernel, which can take the form of an object class;
  c) that it is possible for any number of objects to be formed from each non-special object class, each object having its own data area, a procedure part for the execution of either one or more machining methods, geometry methods, kinematic methods or technology methods etc. and a message mechanism for communication with other objects;
  d) that it is possible for there to be formed from the object class of the control data types any number of objects, which have one or more control data generating methods;

e) that the user information input via the man-machine interface is interpreted by the sequence control and leads to an activation of the respectively selected objects;

f) that the activated objects exchange the mutually required information by means of their message mechanism, the activated objects contributing their share-of control data generation status-dependently directly or by means of further objects and consequently forming an executable functional unit for the numerical control system; and g) that the sequence control itself takes the form of an object class, the objects of which have methods which allow the status-dependent interpretation of an abstract description of the operating sequence from the control-internal data management.

The sequence control itself takes the form of an object class, the objects of which allow the status-dependent interpretation of an abstract description of the operating sequence from the control-internal data management, whereby the operating sequence can be easily modified by means of an alteration of the abstract description addressed.

According to an advantageous development of the present invention, each object can be assigned a visualization part, upon the activation of which a respective object can impose visualization requirements on the operating surface of the man-machine interface or can display its object-own data in a form in which it can optionally be edited. This on the one hand allows an easy selection of the objects required, on the other hand the characteristics and data of the objects can be easily modified via the operating surface.

By specific configuration of the object classes or objects, the overall system for numerical control allows a distinct form for any requirements in the area of man-machine communication, each distinct form resulting in a self-contained control variant with its own independent technical action, without elements of the overall system which are not required in a particular case having to be taken along as ballast, in terms of either software or hardware, or having to be processed.

For a user-friendly control system it is advantageous, furthermore, to map all the object classes, including the sequence control, in the control-internal data management as an abstract data model in such a way that it can be supplemented by abstract application-specific types of data or modified by application-specific object forms. This allows the user to cater for special features of tool and robot control systems, even if the control system manufacturer specifically provided only the basic prerequisites therefor, if for example there was initially provided only a universal form of the object classes and objects or their mapping in the abstract data model in the basic system, which the user can modify, for example by copying and altering by means of suitable editors, and can link up with the execution system.

According to a further advantageous development of the present invention, the user, i.e. the control system manufacturer himself, the machine manufacturer or the machine user, can provide the release of the possible object combinations which can be used for the respective task on the machine tool application-specifically with access mechanisms which eliminate the possibility of unworkable configurations in the intended application environment.

DETAILED DESCRIPTION

Figure 1:
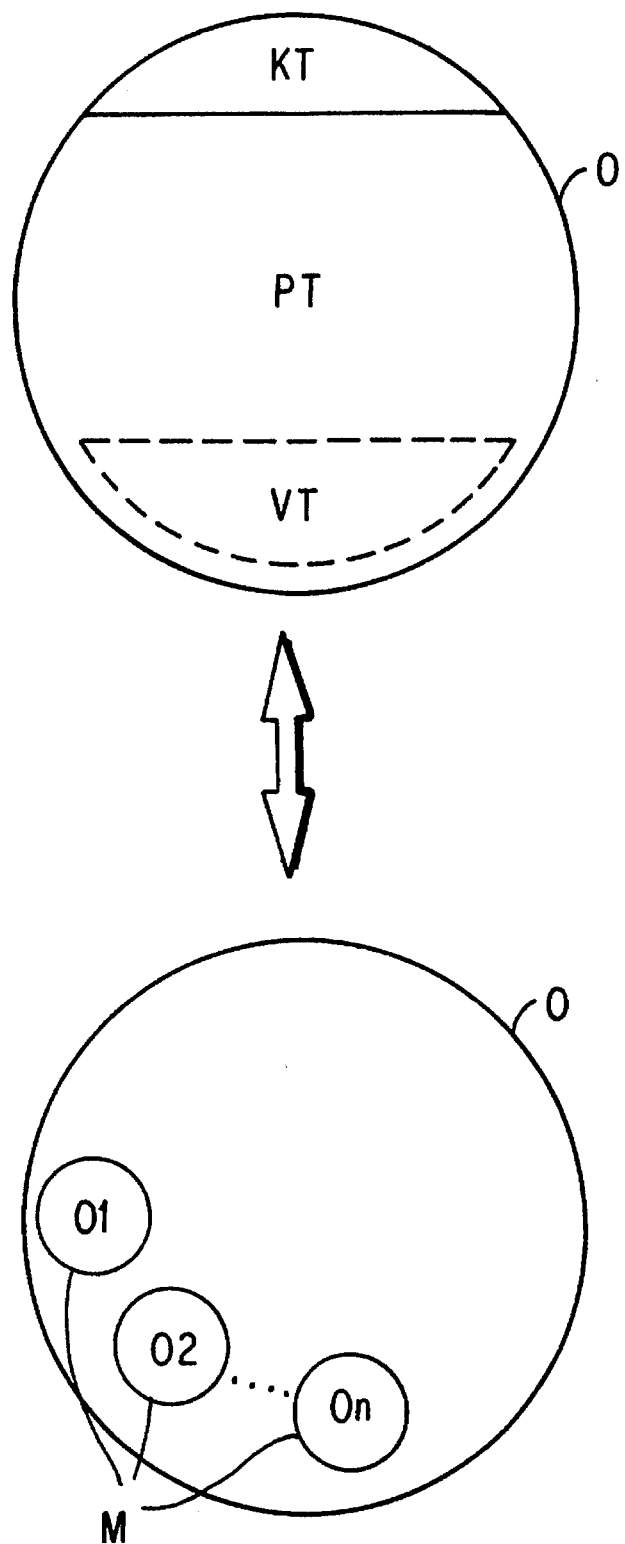
FIG. 1 shows two equivalent representations of an object O.

FIG. 1 shows the basic construction of an object O as an entity of a module or of an object class. Such an object O represents the basic module for the man-machine communication of a numerical machine tool or robot control system and may be realized by software or by software and hardware. Thus, initially it has no tangible form and is therefore represented (in accordance with set theory) by a hand-drawn circle. It has its own data area, which for reasons of clarity is not shown, a communication part KT and a procedure part PT and, optionally (indicated by dashed lines) a visualization part VT. The procedure part PT and the optional visualization part VT comprise one or more O1 to On software procedures or methods M, which execute, for example, one or more machining methods, one or more geometry methods, one or more kinematic methods or one or more technology methods etc. and can optionally impose visualization requirements. The execution of these methods M or functions could, however, similarly be performed by a hardware logic, so that the procedure part PT would be partly realized by hardware. The communication between the procedure part PT and the outside world of the object is assumed by the communication part KT. The communication part KT is generally responsible for communication with the communication parts KT of other objects O. Special objects are responsible for communication beyond the model, such as for example the sequence control object. In a conventional data processing system, this communication is generally performed by means of a bus system if the modules are spatially separated in different hardware assemblies. The communication part KT may be of such a form that it communicates with the outside world in an abstract high-level language and with the procedure part PT in a machine-oriented language.

By virtue of a multiplicity of object classes and their object entities, all the tasks of man-machine communication in any machine tool or robot control system can be covered. The machine tool control system may, for example, support the workshop-oriented programming (WOP) for controlling a simple lathe or else comprise flexible production in a flexible manufacturing system (FMS). If further new tasks in the area of man-machine communication are added in future to the previously usual tasks of a machine tool or robot control system, for example the inclusion of an expert system for cutting value determination, all that is required is to create one or more further object classes or object entities which provide the corresponding-methods.

Figure 2:
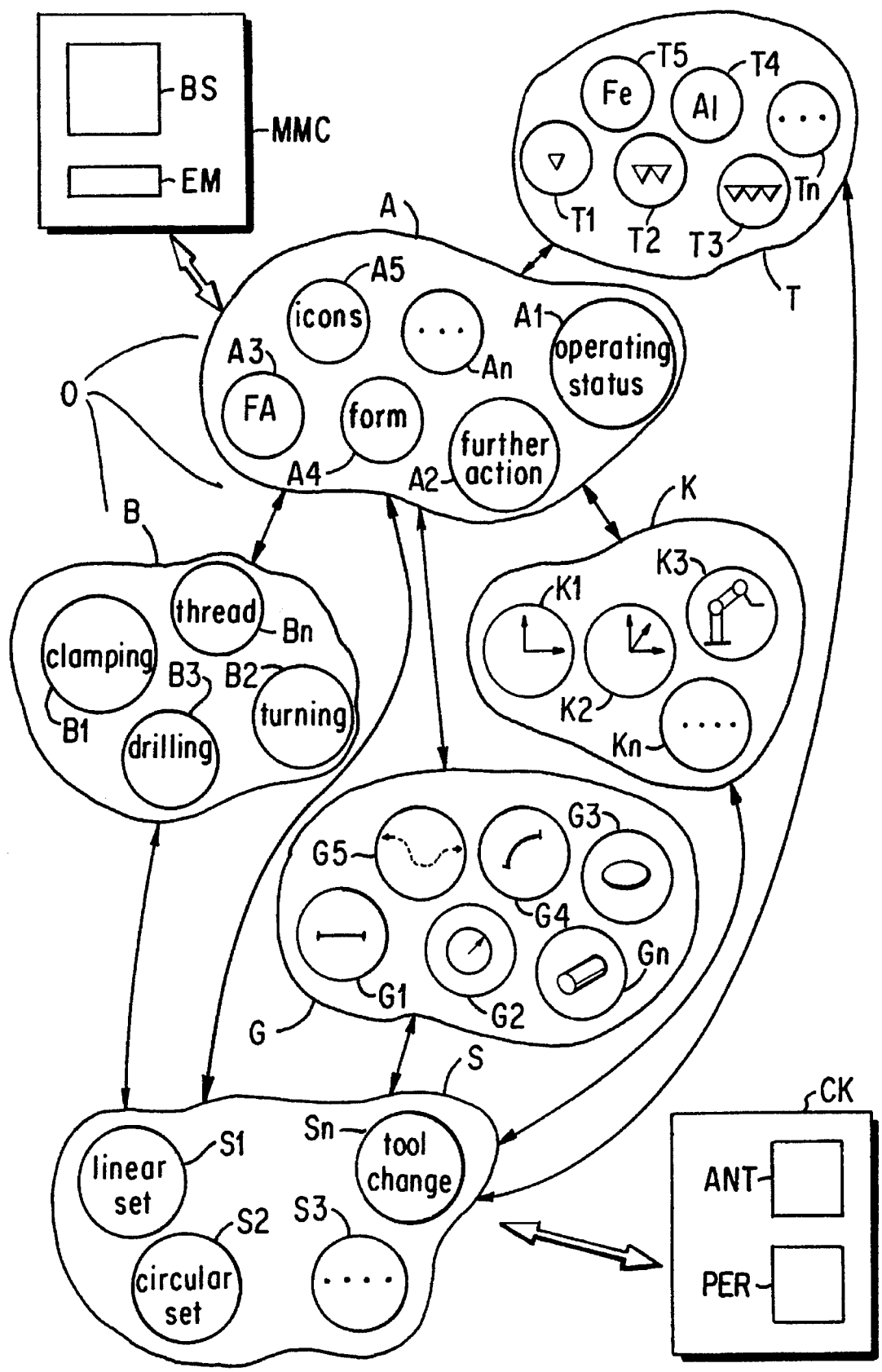
FIG. 2 shows object entities O for sequence control A, machining B, geometry G, kinematics K, technologies T, control data S.

Represented in FIG. 2 are a total of six exemplary object entities O, which have a plurality of methods for workshop-oriented programming (WOP). In this case, the object for sequence control A comprises the methods A1 to An, the machining object B comprises the methods B1 to Bn, the geometry object G comprises the methods G1 to Gn, the kinematic object K comprises the methods K1 to Kn, the technology object T comprises the methods T1 to Tn and the object for control data generation S comprises the methods S1 to Sn. Each individual object has its own data area, which is not explicitly represented. Also shown is a man-machine interface MMC, which has a screen BS and one or more input means EM. It is indicated by a double-headed arrow from the man-machine interface MMC to the object sequence control A that the sequence control A on the one hand interprets the input user information and, if need be, passes said information on by means of corresponding messages via the communication part KT to the other objects B, G, K, T or S, on the other: hand ensures the control of the screen BS, which may be a graphics screen, for example at the request of the visualization part VT of other objects. For this purpose, the sequence control A object also has methods for interpretation of the abstract description of operating surface elements, such as for example menu trees, forms, icons or graphics etc., which are stored in the control-internal data management, which is not explicitly represented.

In FIG. 2, for the sake of clarity, the division of the objects known from FIG. 1 into KT, PT, VT has been dispensed with in the case of the methods shown in the individual objects A, B, G, K, T, S, so that there are only shown hand-drawn circles, the contents of which are in some cases indicated by symbols which refer to the respective function of the method. For instance, the sequence control A object has the methods A1 to An, which are required for the control and visualization of the operating sequence: the method A1, for example, for registering the current operating status, the method A2 for initiating further actions, for example status transitions, the method A3 for managing the production phases FA, the methods A4 to An to handle the visualization of specific elements of the operating surface such as forms, icons or graphics etc.

The machining object B, which has the machining methods B1 to Bn, specifies the machining process and the equipment to be used for a defined production phase, for example B1 specifies the mounting (for example clamping claws), B2 specifies machining by turning (for example facing), B3 specifies machining by drilling (for example deep-hole drilling) and Bn specifies thread machining (for example tapping), in each case dependent on the tools used.

The geometry object G comprises the geometry methods G1 to Gn, which realize modeling procedures for straight lines G1, circles G2, ellipses G3, arcs G4, positioning coordinates G5 in order to produce for example a computer-internal representation of the geometric body involved in the production process. Three-dimensional geometries, such as for example cylindrical shapes Gn, can also be modeled. (The cylindrical shape Gn is representative of all other possible three-dimensional geometric operations).

The kinematic object K has the methods K1 to Kn for various kinematic movements of machine tools or robots, the method K1 being able to take into account the function of a two-axis movement, the method K2 being able to take into account the function of a three-axis movement and the method K3 being able to take into account a specific robot movement, in each case in accord with the machine tool available or with the handling system used.

The technology object T is made up of the methods T1 to Tn, which are required for technologically appropriate execution of the machining processes. For example, it is symbolized by the inverted triangles of methods T1 to T3 that these have all the necessary empirically based procedures for the surface-machining of workpieces, such as for example roughing (method T1), finishing (method T2) and precision finishing (method T3). These technology methods are additionally supplemented by further specified details, for example by "material" methods T4 and T5, which provide specific technological information with respect to the optimum cutting values according to the tool cutting material used and the material of the blank.

In the exemplary-embodiment, the object finally has for control data generation S methods which use the information of the other objects A, B, G, K, T to produce control data sets which can be executed by the numerical control kernel CK and consequently ensure the control of the drives ANT and of the peripherals PER. For example, the method S1 creates a data set for linear movement (linear set) of one or more machine axes, the method S2 creates a corresponding data set for circular movement (circular set) and the method Sn creates a data set for control of a tool turret (tool change) on the machine peripherals.

By the interaction of methods A1 to An, B1 to Bn, G1 to Gn, K1 to Kn, T1 to Tn and S1 to Sn in different configuration phases, the objects A, B, G, K, T and S gradually receive a tangible form in the form of a machine-specific and workpiece-specific production model, i.e. a production-engineering map of the production task to be performed on the machine, in a control-internal representation. In a first configuration phase, the control system manufacturer initially gives the objects a universal form, which, like that represented by way of example in FIG. 2, is generally applicable for lathes. In a further step, the machine manufacturer can supplement the universal form of the objects by his own know-how with respect to his machine, for example by optimized tool operating data. The predefined form of the objects thus produced, which is reflected in the object's own data and is therefore not explicitly represented in FIG. 2, then allows the final user to concentrate with a reduced amount of effort on predefining the information corresponding to his specific task, that is to say for example performing the workshop-oriented programming (WOP) of a turned part. This is described in more detail below with reference to FIGS. 3 and 4.

Figure 3:
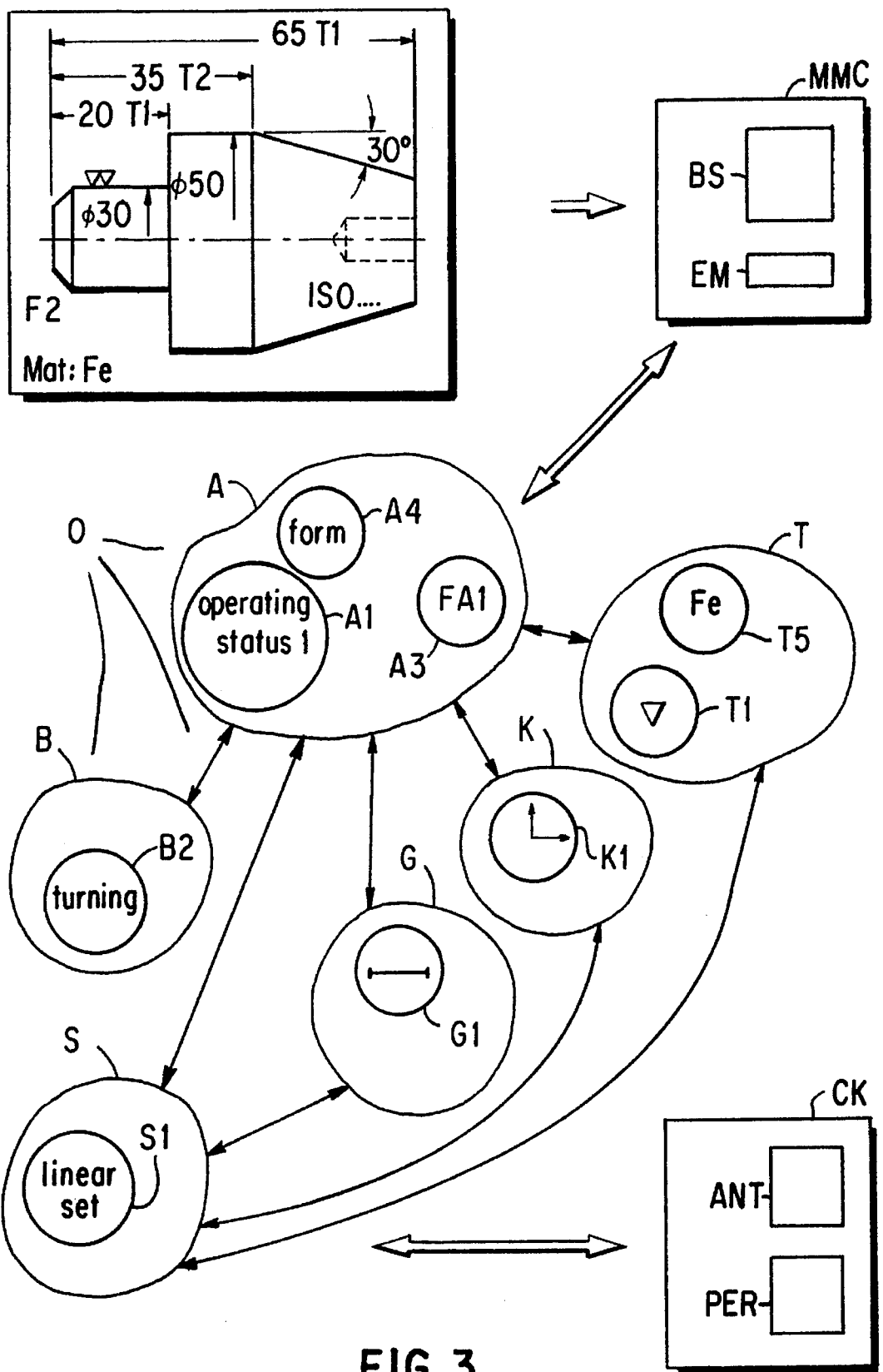
FIG. 3 shows a workpiece-specific form of objects for a first production phase on the basis of a workshop drawing of a turned part.

Represented in FIG. 3 is a workshop drawing of a partly cylindrical and partly frustoconical turned part with the necessary geometrical and technological details. This workshop drawing is used by the final user of the machine tool as a master for input via the man-machine interface MC, the input being performed using the input means EM, for example via a keyboard. The man-machine interface MMC is in connection with the sequence control A, which visualizes the objects required for the respective task via the screen BS, to be precise using the control-internal abstract description of the operating sequence and at the request of the methods of the visualization parts VT within the individual objects. The objects O may also, however, remain completely in the background with their configured basic form. For example, for the turned part shown in FIG. 3, only a few data need to be input, such as the mounting dimensions of the unmachined part, the fact that a turned part is to be produced, the material used, the surface quality and the dimensions of the turned part, in addition to the existing basic form of the objects. Then the appropriate methods M for the respective production phases FA are called up from the available objects O via the man-machine interface MMC and the sequence control A. The individual objects then contain the information necessary for production of the part in the form of a distinct production-specific form of the object's own data. The object for the generation of control data S then fetches this information via the communication part and compiles it to form a data set which can be processed by the machine tool/robot control kernel CK.

In FIG. 3, the sequence control A is used to select, for example for the production phase FA1, the geometry method G1 for straight lines, the kinematic method K1 for two-axis machining operations, the technology method T5 for the material Fe and also T2 for the finishing process and the method B2 for machining by turning. Although the double-triangle symbol for finishing has been input from the workshop drawing, the sequence control A, together with the pre-configured empirical base, initially calls up automatically the technology method T1 for "roughing" surface machining, since this machining step has to be executed first.

Each object which requires further data via the man-machine interface MMC initially appears on the screen BS by means of a request of the visualization part VT and asks for the required data. For example, the geometry method G1, which was selected for straight lines, presents itself with a form in which the starting points and the end points of the path to be machined are to be input. Other data can also be requested directly from the existing empirical base, which is reflected in the basic form of the pre-configured objects.

As indicated by the arrows, the objects B, G, K, T, S can communicate with one another via the sequence control A. The objects can, however, also communicate with one another directly between themselves via their communication part KT (FIG. 1), although this is not indicated by arrows for the sake of clarity.

For example, the method B2 for machining by turning requires geometric formations from the geometry object G to execute the cutting plan correctly or because the (maximum) feed to be set also depends on the diameter and other geometrical data.

When all data required for the current production phase of the turned part are input or have been determined from the pre-configured empirical base, a method S1 of the control data object S is called up via the operating surface and the sequence control A or else automatically and is linked up via the communication part KT with the objects K, G, . . . to obtain information from these in order to use it to update the internal production model and generate from this a machine-specific data set which can be processed by the control part CK of the machine tool or of the robot; in this case a linear set.

In addition to the user inputs by the user, there thus forms control-internally due to the communication of the individual objects an executable numerical control system, which prepares the execution of a defined production phase of the turned part shown in FIG. 3 from the blank mounted in the machine tool and, together with the control kernel CK, can carry it out.

Figure 4:
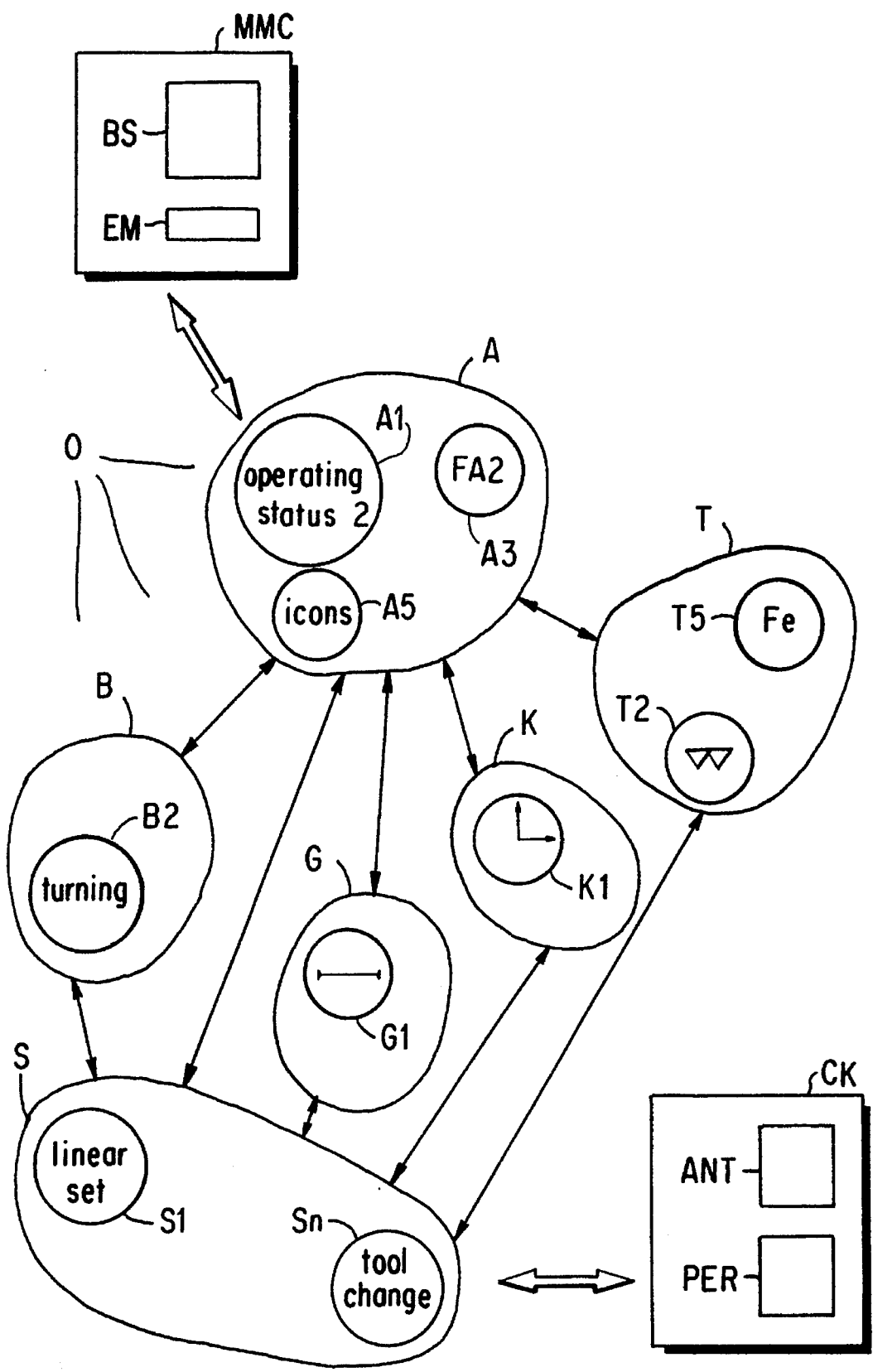
FIG. 4 shows a workpiece-specific form of objects for a second production phase.

As shown in FIG. 4, in a second production phase FA2, the object configuration is changed only slightly by the sequence control, namely in that the technology method T2 for the "finishing" final surface machining is selected by means of an icon. Consequently, the type of surface machining is automatically taken into account by the method B2 for machining by turning by altered feed values, which are determined by the technology object T, also in that a tool change is prompted by means of the method Sn of the control data object S.

What is claimed is:

1. A numerical control system for machine tools or robots, in which an object-oriented programming takes place, in that object classes are provided, from which a number of objects can be formed, and a message mechanism exists for communication with other objects, comprising:

a) a man-machine interface for inputting user information;

b) a sequence control;

c) a plurality of object classes for abstract types of data, including data on machining, geometry, kinematics, and technology;

d) a special object class for abstract types of control data, wherein said special object class has one or more control data generating methods;

e) an integrated numerical control kernel, which can take the form of an object class, wherein any number of objects can be formed from each of the plurality of object classes, wherein each of said objects has its own data area;

f) a procedure part for executing one or more methods, including machining methods, geometry methods, kinematic methods or technology methods; and f) a message mechanism for communication with other objects, wherein any number of objects can be formed from the special object class, the user information input via the man-machine interface is interpreted by the sequence control and leads to an activation of selected objects, the activated objects exchange mutually required information by means of their message mechanisms, the activated objects contribute their share of control data generation status-dependently directly or by means of further objects and consequently form an executable functional unit for the numerical control system, the sequence control itself takes the form of an object class, the objects of which have methods that allow a status-dependent interpretation of an abstract description of an operating sequence from a control-internal data management.

2. The numerical control system according to claim 1, wherein each object is assigned a visualization part, upon the activation of which a respective object can impose visualization requirements on an operating surface of the man-machine interface or can display the object's own data in a form in which it can optionally be edited.

3. The numerical control system according to claim 2, wherein all the object classes, including the sequence control, are formed in the control-internal data management as abstract data models, and the data models can be supplemented by abstract application-specific types of data, or can be modified by application-specific object forms.

4. The numerical control system according to claim 1, wherein object combinations can be provided with selective access mechanisms.

5. The numerical control system according to claim 2, wherein object combinations can be provided with selective access mechanisms.

6. The numerical control system according to claim 3, wherein object combinations can be provided with selective access mechanisms.

\* \* \* \* \*